United States Patent [19]

Taylor

[11] Patent Number: 4,564,991
[45] Date of Patent: Jan. 21, 1986

[54] TOOL FOR HOLDING A BLADE FOR INSTALLATION AND REMOVAL THEREOF

[76] Inventor: Harold E. Taylor, 4196 Riverside Dr., Columbus, Ohio 43220

[21] Appl. No.: 663,355

[22] Filed: Oct. 22, 1984

[51] Int. Cl.⁴ .................. B23P 19/00; B23P 19/04; B23Q 3/00
[52] U.S. Cl. .................. 29/426.5; 29/526 R; 29/240; 29/267; 29/283; 51/218 T; 51/246; 76/82.1; 81/488; 254/131; 269/319
[58] Field of Search ............. 29/426.5, 526 R, 240, 29/281.6, 281.4, 283, 267; 269/319, 409; 51/218 T, 246; 76/82.1; 254/131; 172/552; 56/295; 81/488

[56] References Cited

U.S. PATENT DOCUMENTS

| | | | |
|---|---|---|---|
| 1,076,919 | 10/1913 | Speck | 76/82.1 |
| 1,855,537 | 4/1932 | Zachary | 254/131 |
| 2,736,088 | 2/1956 | Thygeson | 254/131 X |
| 2,976,602 | 3/1961 | Nelson | 76/82.1 X |
| 3,122,354 | 2/1964 | Rodeback | 254/131 |
| 3,678,561 | 7/1972 | Mautz, Sr. | 29/283 X |
| 3,826,159 | 7/1974 | Otto | 76/82.1 X |
| 4,297,921 | 11/1981 | Wydra | 29/283 X |
| 4,315,339 | 2/1982 | Lightner | 29/267 X |
| 4,392,264 | 7/1983 | Booe, Jr. | 29/267 X |
| 4,457,033 | 7/1984 | Lightner | 29/267 X |

Primary Examiner—Charlie T. Moon

[57] ABSTRACT

Disclosed is a tool for holding a lawnmower blade for installation and removal thereof. The tool comprises an elongate lever having a handle at one end, a blade engaging section about the other end, and a channel therebetween for accommodating the housing of a lawnmower. The blade engaging section comprises a pair of spaced-apart adjustably mounted stop pins for preventing rotational movement of a lawnmower blade placed therebetween. The stop pins have inwardly-facing retaining heads for preventing the lawnmower blade from slipping off said stop pins.

6 Claims, 3 Drawing Figures

TOOL FOR HOLDING A BLADE FOR INSTALLATION AND REMOVAL THEREOF

BACKGROUND OF THE INVENTION

The present invention relates to implements useful in the attachment and detachment of blades from bladed tools, and more particularly to an implement which is particularly useful for holding a lawnmower blade for installation and removal of such blade.

Anyone who has been faced with the challenge of replacing a used lawnmower blade or sharpening the old blade will appreciate the problems involved in safely removing the old blade and installing the new or sharpened old blade. A variety of techniques have been employed in this task. Typically, a 2×4 or other piece of lumber is wedged between the blade and the grass discharge chute of the lawnmower housing for fixing the blade in a position so that the retaining nut can be removed without the blade rotating. Often, the 2×4 slips resulting in a cut or bruise being sustained. Alternatively, sometimes resort is had to thick, leather work gloves for holding the blade secure while the nut is loosened. Merely grasping the end of the blade with a gloved hand does not provide sufficient leverage so that an overly-tightened or rusted nut can be removed.

BROAD STATEMENT OF THE INVENTION

Broadly, the present is directed to an implement or tool adapted to hold a blade for installation and removal of such blade from a bladed instrument. Advantageously, the tool is adapted for holding a lawnmower blade for installation and removal thereof. Such tool comprises an elongate lever having a handle at one end, a blade engaging section about the other end, and a channel therebetween for accommodating the housing of a lawnmower. The blade engaging section comprises a pair of spaced-apart, adjustably mounted stop pins for preventing rotational movement of a lawnmower blade placed therebetween. The stop pins each have inwardly-facing retaining heads for preventing the lawnmower blade from slipping off said stop pins.

Another aspect of the present invention is a method for installation and removal of a lawnmower blade from a lawnmower. Such method comprises holding the lawnmower blade in a blade engaging section of a tool which comprises an elongate lever having a handle at one end, said blade engaging section about the other end, and a channel therebetween for accommodating the housing of the lawnmower. The blade engaging section comprises a pair of spaced-apart, adjustably mounted stop pins for preventing rotational movement of the lawnmower blade placed therebetween. The stop pins have inwardly-facing retaining heads for preventing the lawnmower blade from slipping off said stop pins. After the lawnmower blade is held by the tool, the retaining nut is loosened or tightened for installation or removal, respectively, of said lawnmower blade from said lawnmower.

Advantages of the present invention include a tool specifically designed for safety during the installation or removal of a lawnmower blade from a lawnmower. Another advantage is a tool which provides additional leverage which makes the tightening or loosening of the lawnmower retaining nut an easier chore. A further advantage is a tool which is specifically designed to accommodate the structure of a lawnmower blade and components. These and other advantages will be readily apparent to those skilled in the art based upon the disclosure contained herein.

These drawings wll be described in detail in connection with the description which follows.

DETAILED DESCRIPTION OF THE INVENTION

The lawnmower blade tool of the present invention is designed for safety so that risk of injury during the lawnmower blade installation or removal is minimized. The handle of the tool is located as far as possible away from the blade engaging section so that risk of injury from the sharpened blade is minimized. Additionally, the tool has been specially designed for easy in situ use, as will be described in greater detail below.

Figure 1:
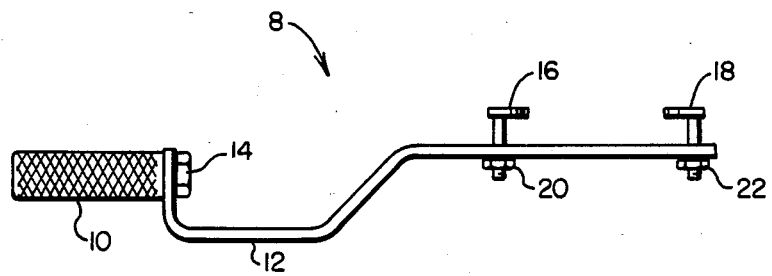
FIG. 1 is a side elevational view of the tool of the present invention.

Referring to FIG. 1, blade holding tool 8 is commprised of elongate lever 12 to which is attached handle 10 by means of securing nut 14. Adjacent handle 10, lever 12 is in the shape of a channel for accommodating housing 40 (FIG. 3) of lawnmower 38. About the other end of elongate lever 12 is the blade engaging section. The blade engaging section is composed of stop pin 16 and stop pin 18 which are in spaced-apart relationship. Stop pin 16 is secured to lever 12 via nut 20 while stop pin 18 is secured to lever via nut 22. Stop pins 16 and 18 each have inwardly-facing retaining heads (see FIG. 2).

Figure 2:
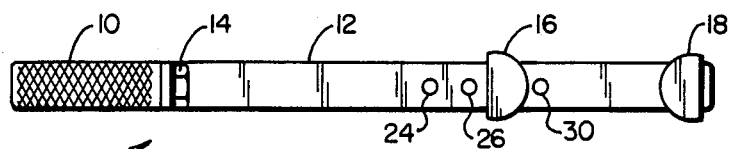
FIG. 2 is an overhead view of the tool of FIG. 1.

Referring to FIG. 2, the location of stop pin 16 may be adjusted by placing stop pin 16 through hole 24, hole 26, hole 28 (not shown), or hole 30. Because stop pin 16 is adjustably mounted to lever 12, there is little need for providing holes for adjustably locating stop pin 18 in lever 12. Stop pins 16 and 18 are threaded about their lower ends. The holes in lever 12 for accommodating stop pins 16 and 18 are internally threaded for receiving the threaded lower ends of stop pins 16 and 18. Nuts 20 and 22 can be tightened against the underside of lever 12 for locking stop pins 16 and 18 in place. Pins 16 and 18 are vertically adjustable by their threads. Vertical adjustability of pin 18 can be especially important since some blade attachment arrangements include caps, notched collars, stiffeners and the like. Vertical adjustability is needed in order for the retaining head of stop pin 18 to fit over such attachment arrangements.

Materials of construction of tool 8 preferably include hardened steel for durability and preferably such material is rendered corrosion-resistant by galvanizing, electrofinishing techniques, use of stainless steel, or other conventional technique. Alternatively, materials of construction may include hardened polymers or plastics.

Figure 3:
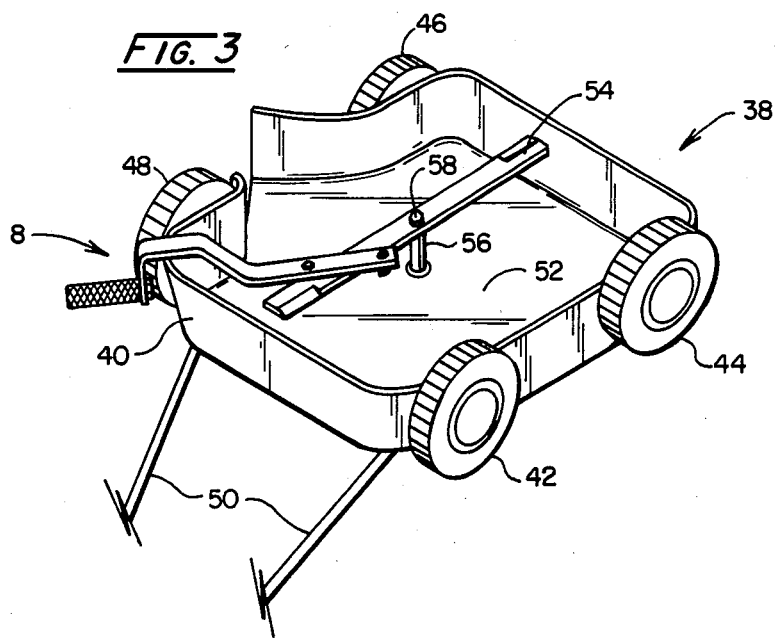
FIG. 3 is a perspective view of the underneath side of a lawnmower wherein the tool of FIG. 1 is operatively engaging a lawnmower blade.

Referring to FIG. 3, lawnmower 38 is composed of housing 40; wheels 42, 44, 46, and 48, handle 50, and blade assembly 52. The engine or electric motor, gas and speed controls (for self-powered models) and other features are not depicted in FIG. 3, but are to be provided in conventional fashion. Blade assembly 52 is composed of lawnmower blade 54 secured to shaft 56 by nut 58. Lawnmower blade tool 8 is seen in its operative position wherein the blade engaging section is confronting blade 54. It will be observed that the operator need only grasp handle 10 of tool 8 for securing lawnmower blade 54 and preventing its rotation. Additional torque is afforded the holder by virtue of the elongate design of lever 12 (note the distance between shaft 56 and handle 8). The operator need only utilize a socket set, crescent wrench, or other suitable device for loosening or tightening nut 58. It further will be observed that the channel in lever 12 for accommodating housing 40 means that the operator need only slightly raise housing 40 off of the ground in order to secure blade 54 with tool 8, i.e. the design of tool 8 is such that the lawnmower need not be fully turned over as in FIG. 3 for use of tool 8.

I claim:

1. A tool for holding a lawnmower blade for installation and removal thereof, which comprises an elongate lever having a handle at one end, a blade engaging section about the other end, and a channel therebetween for accommodating the housing of a lawnmower, said blade engaging section comprising a pair of spaced-apart, adjustably mounted stop pins for preventing rotational movement of the lawnmower blade placed therebetween, said stop pins having inwardly-facing retaining heads spaced-apart from said elongate lever for preventing the lawnmower blade from slipping off said stop pins.

2. The tool of claim 1 wherein said handle is removably attached to said elongate lever.

3. The tool of claim 1 wherein said elongate lever bears internally threaded holes penetrating therethrough for receiving said stop pins which also are threaded about the end opposite said retaining heads.

4. The tool of claim 3 wherein the threaded ends of said stop pins are screwed through said elongate lever and lock nuts are attached to said ends.

5. The tool of claim 1 wherein said stop pins are adjustably mounted to said elongate lever to adjust the distance between the elongate lever and the retaining heads of said stop pins.

6. A method for holding a lawnmower blade for installation or removal of said lawnmower blade from a lawnmower, which comprises holding the lawnmower blade in a blade engaging section of a tool which comprises an elongate lever having a handle at one end, said blade engaging section about the other end, and a channel therebetween for accommodating the housing of the lawnmower, said blade engaging section comprising a pair of spaced-apart, adjustably mounted stop pins for preventing rotational movement of the lawnmower blade placed therebetween, said stop pins having inwardly-facing retaining heads for preventing the lawnmower blade from slipping off said stop pins; and tightening or loosening a retaining nut for installation or removal, respectively, of said lawnmower blade from said lawnmower.

* * * * *